United States Patent
Attalla et al.

(10) Patent No.: US 9,189,260 B2
(45) Date of Patent: Nov. 17, 2015

(54) RESOURCE ALLOCATION FOR VIRTUAL MACHINES AND LOGICAL PARTITIONS

(71) Applicant: International Business Machines Corporation, Armonk, NY (US)

(72) Inventors: Emad Attalla, Dearborn Heights, MI (US); Gerhard Widmayer, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 13/628,109

(22) Filed: Sep. 27, 2012

(65) Prior Publication Data

US 2014/0089917 A1 Mar. 27, 2014

(51) Int. Cl.
G06F 9/455 (2006.01)
G06F 9/50 (2006.01)
G06F 11/36 (2006.01)
G06F 11/34 (2006.01)

(52) U.S. Cl.
CPC ............ *G06F 9/455* (2013.01); *G06F 9/45558* (2013.01); *G06F 9/5077* (2013.01); *G06F 9/5083* (2013.01); *G06F 11/3433* (2013.01); *G06F 11/36* (2013.01); *G06F 2009/4557* (2013.01); *G06F 2201/81* (2013.01); *G06F 2201/815* (2013.01); *G06F 2209/5022* (2013.01)

(58) Field of Classification Search
None
See application file for complete search history.

(56) References Cited

U.S. PATENT DOCUMENTS

2008/0028409 A1* 1/2008 Cherkasova et al. .......... 718/104
2008/0295096 A1* 11/2008 Beaty et al. ....................... 718/1
2008/0320121 A1 12/2008 Altaf et al.
2010/0250748 A1* 9/2010 Sivasubramanian et al. . 709/226
2013/0055283 A1* 2/2013 Mopur et al. ................. 718/104

FOREIGN PATENT DOCUMENTS

WO 2011131400 A1 10/2011

OTHER PUBLICATIONS

Dave Marshall; "Dynamic Memory Allocation and Dynamic Structures"; Jan. 5, 1999; <http://www.cs.cf.ac.uk/Dave/C/node11.html>.
"PowerVM QuickStart"; Version 1.2.0; Mar. 29, 2010; <http://www.tablespace.net/qucikcsheet/powervm-quickstart.html>.
"Micro Instances"; awsdocumentation—Amazon Elastic Compute Cloud User Guide; API Version Aug. 15, 2012; Micro Instances—Amazon Elastic Compute Cloud; Printed: Sep. 26, 2012; <http://docs.amazonwebservices.com/AWSEC2/latest/UserGuide/concepts_micro_instances.html>.

* cited by examiner

*Primary Examiner* — Emerson Puente
*Assistant Examiner* — Jonathan R Labud
(74) *Attorney, Agent, or Firm* — David M. Quinn; Ian McKee (57) ABSTRACT

A computer determines that a utilization level of a resource has satisfied a threshold. The computer scales the allocation of the resource to the furthest of the current allocation of the resource plus a parameter and of a historical limit. The computer determines if the scaled allocation of the resource is outside the historical limit and if so, sets the historical limit equal to the scaled allocation of the resource. The computer determines whether the scaling of the allocation of the resource will result in an allocation oscillation. The computer determines if the scaled allocation of the resource is outside a boundary parameter and if so, sets the allocation of the resource equal to the boundary parameter.

20 Claims, 4 Drawing Sheets

RESOURCE ALLOCATION FOR VIRTUAL MACHINES AND LOGICAL PARTITIONS

FIELD OF THE INVENTION

The present invention relates generally to virtual machines and logical partitions, and more specifically to allocating resources to virtual machines and logical partitions.

BACKGROUND

In system virtualization, multiple virtual machines are created within a single physical system. The physical system can be a stand-alone computer, or alternatively, a computing system utilizing clustered computers and components, such as a cloud computing system. Virtual machines are independent operating environments that use logical divisions of physical resources such as processors, memory, and input/output (I/O) systems. A virtual machine hypervisor logically divides the real resources amongst the virtual machines. Virtual machine hypervisors, also called virtual machine managers, use a thin layer of code in software or firmware to achieve resource sharing among the multiple virtual machines. The hypervisor typically virtualizes memory allocation to different virtual machines, and this often enables a greater virtual allocation of memory than real memory. The hypervisor also enables communication between virtual machines on the same physical machine, and to external networks. Typically, a "guest" operating system and one or more applications execute in each virtual machine.

A logical partition hypervisor divides physical system resources into isolated logical partitions ("LPARs"). A logical partition is similar to a virtual machine but typically has an allocation of real memory instead of virtual memory. Each logical partition operates like an independent system running its own operating environment. Exemplary operating environments include AIX®, IBM® i, Linux®, and the virtual I/O server (VIOS). The hypervisor can allocate dedicated processors, I/O adapters, and memory to each logical partition. The hypervisor can also allocate portions of shared processors to each logical partition. Further, the hypervisor can create a shared processor pool from which the hypervisor allocates virtual processors to the logical partitions as needed. In other words, the hypervisor creates virtual processors from physical processors so that logical partitions can share the physical processors while running independent operating environments.

In addition to defining and managing the logical partitions, the hypervisor can manage communication between the logical partitions. To facilitate communication, each logical partition may have a virtual adapter for communication between the logical partitions, via a virtual switch. The type of the virtual adapter depends on the operating environment used by the logical partition. Examples of virtual adapters include virtual Ethernet adapters, virtual Fibre Channel adapters, virtual Small Computer Serial Interface (SCSI) adapters, and virtual serial adapters. Virtual adapters are often implemented through a VIOS partition which manages the physical I/O adapters (SCSI disks, Fibre Channel disks, Ethernet, or CD/DVD optical devices). The other logical partitions may be considered "clients" or virtual I/O clients (VIOCs) to the VIOS.

A Virtual Machine hypervisor can dynamically allocate and deallocate dedicated or shared resources (such as processors, I/O, and memory) among virtual machines while the virtual machines are actively in use. This allows the hypervisor to redefine available system resources to improve performance for each virtual machine. Such allocation and deallocation can be referred to as scaling.

Similarly, the LPAR hypervisor can dynamically allocate and deallocate dedicated or shared resources (such as processors, I/O, and memory) across logical partitions while the logical partitions are actively in use. This allows the hypervisor to redefine available system resources to improve performance for each logical partition. Such allocation and deallocation can also be referred to as scaling.

Vertical scalability involves assigning to a workload more resources while the workload is running on a physical server or logical partition. Horizontal scalability involves the ability to deploy a workload on additional physical servers or logical partitions. According to current techniques, a hypervisor can vertically scale the resources allocated to a workload according to limits selected by administrative personnel. For example, an administrator can configure the hypervisor to allocate a predetermined number of processors to a virtual machine or LPAR when the existing processors allocated to the virtual machine or LPAR exceed a predetermined level of utilization.

SUMMARY

Embodiments of the present invention provide for a program product, system, and method in which a computer determines that a utilization level of a resource has satisfied a threshold. The computer scales the allocation of the resource to the furthest of the current allocation of the resource plus a parameter and of a historical limit. The computer determines if the scaled allocation of the resource is outside the historical limit and if so, sets the historical limit equal to the scaled allocation of the resource. The computer determines whether the scaling of the allocation of the resource will result in an allocation oscillation. The computer determines if the scaled allocation of the resource is outside a boundary parameter and if so, sets the allocation of the resource equal to the boundary parameter.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Figure 1:
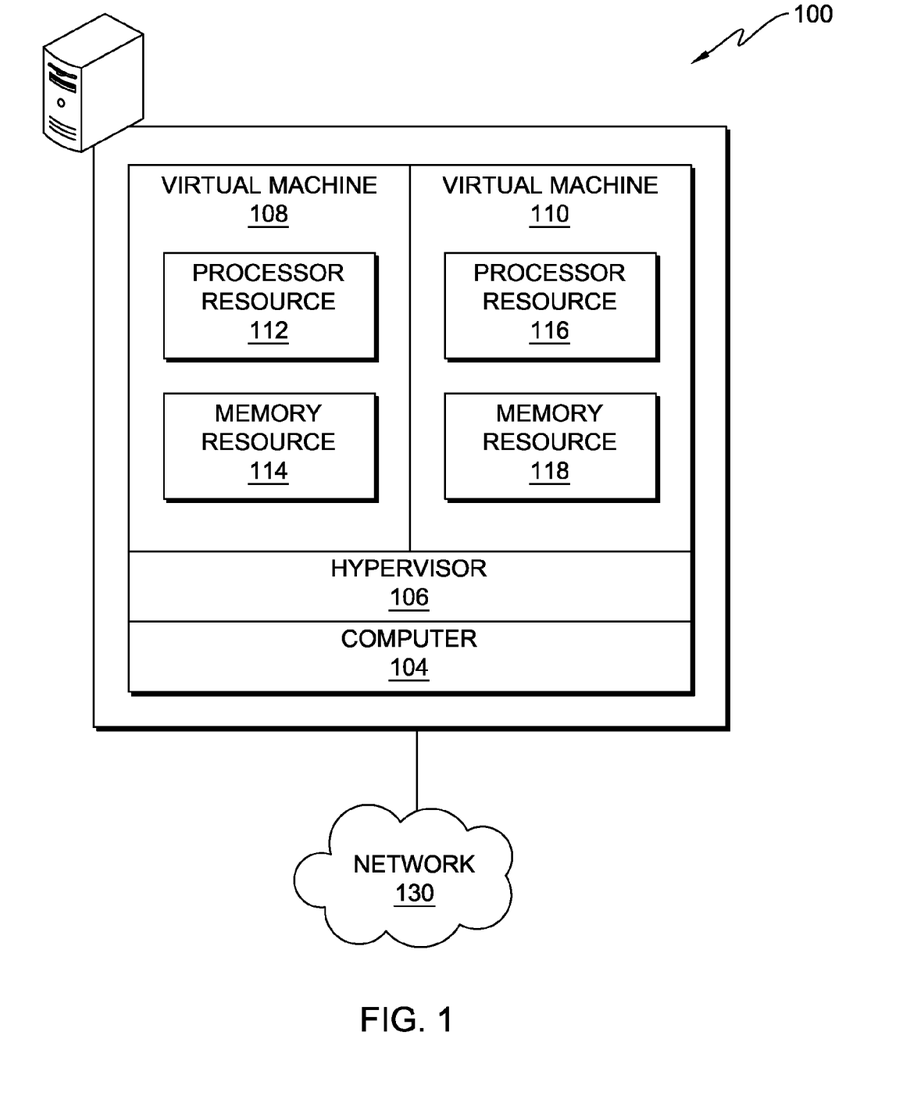
FIG. 1 illustrates a virtualized computer environment for vertically scaling resources allocated to a virtual machine, according to one embodiment of the present invention.

The present invention will now be described with reference to the Figures. FIG. 1 illustrates virtualized computer environment 100 for vertically scaling resources allocated to a virtual machine, according to one embodiment of the present invention. Virtualized computer environment 100 includes real computer 104 and network 130. In general, computer 104 can be any programmable electronic device as described in further detail with respect to FIG. 4. In one embodiment, hypervisor program 106 executes in computer 104 and logically divides the resources of computer 104 amongst virtual machines 108 and 110. For example, virtual machine 108 includes processor resource 112 and memory resource 114, while virtual machine 110 includes processor resource 116 and memory resource 118. In one embodiment, each of the respective virtual machines 108 and 110 executes an independent or "guest" operating system. Any number of virtual machines may be created and may exist on one or more computers within virtualized computer environment 100.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between computer 104 and other devices. In one embodiment, communications to and from network 130 may be routed through a shared Ethernet adaptor to virtual adapters of virtual machines 108 and 110.

Hypervisor program 106 defines virtual machines 108 and 110 from the resources of computer 104 through logical sharing of processors, storage disks, network cards, memory, and other resources. After definition, each of virtual machines 108 and 110 typically receives a workload to begin processing. Hypervisor program 106 can perform standard operating system functions and manages communications between virtual machines 108 and 110 via a virtual switch, in one embodiment. Hypervisor program 106 can use a thin layer of code in software or firmware to achieve fine-grained, dynamic resource sharing among virtual machines 108 and 110. Hypervisor program 106 can dynamically allocate and deallocate resources to virtual machines 108 and 110 while they are actively in use. This allows hypervisor program 106 to vertically scale resources to optimize performance for each of virtual machines 108 and 110, according to several thresholds and a variety of parameters stored in hypervisor program 106, as described in greater detail below.

Figure 2A:
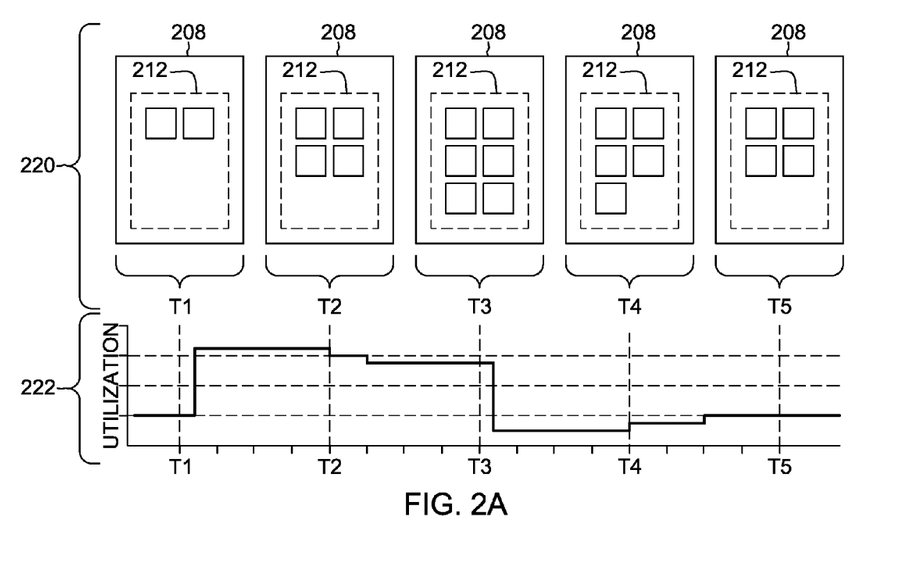
FIGS. 2A and 2B illustrate time lapse progressions of the vertical scaling of resources allocated to a virtual machine, according to one embodiment of the present invention.

FIG. 2A illustrates a time lapse progression of the vertical scaling of resources allocated to a virtual machine, according to one embodiment of the present invention. In particular, progression 220 illustrates virtual machine 208 at five different times over the period including times T1 through T5, and utilization history 222 illustrates the usage rate of resource 212 of virtual machine 208 over substantially the same period. The horizontal axis of utilization history 222 is marked at five minute intervals, such that the amount of time between each consecutive pair of times in times T1 through T5 is 20 minutes (e.g., time T1 to time T2 is 20 minutes, time T2 to time T3 is 20 minutes, etc.). The vertical axis of utilization history 222 is marked at 25 percent intervals. Responsive to the history of the usage rate, hypervisor program 106 vertically scales resource 212 according to several thresholds and a variety of parameters, as discussed in detail below.

In the depicted embodiment, virtual machine 208 corresponds to virtual machine 108 depicted in FIG. 1, and resource 212 of virtual machine 208 corresponds to processor resource 112. In various other embodiments, the particular resource represented by resource 212 can be different. For example, resource 212 can instead correspond to memory resource 114, another resource of computer 104, or a combination of different types of resources.

Hypervisor program 106 implements a variety of parameters. For example, hypervisor program 106 implements an initial allocation parameter, which specifies the starting allocation of resource 212 that is allocated when virtual machine 208 is initially defined. For example, if the initial allocation parameter of resource 212 is two processors, and if virtual machine 208 is defined shortly before time T1, then resource 212 will be defined as depicted at time T1 in progression 220. Hypervisor program 106 also implements upper and lower boundary parameters, which specify the ultimate boundaries for scaling resource 212. For example, if the upper and lower boundary parameters are two and six processors, respectively, then upon definition shortly before time T1 virtual machine 208 has been defined with a minimal allocation of two processors, with room to grow by four more processors.

Hypervisor program 106 also implements increment and decrement parameters, which specify the amount by which resource 212 can be scaled when a threshold is satisfied. For example, the increment parameter can be two processors, and the decrement parameter can be one processor, such that virtual machine 208 can be scaled up quickly and scaled down slowly, all else being equal. Further, hypervisor program 106 implements burst increase and burst decrease parameters, which specify historical limits, beyond the respective increment and decrement parameters, to which resource 212 can be scaled when a threshold is satisfied. Unlike the previously discussed parameters, which are typically static, the burst increase and burst decrease parameters can change during the operation of virtual machine 208. For example, shortly before time T1, upon definition virtual machine 208 has zero history (i.e., has no period of previous operation). As such, the burst increase parameter is initialized to the lower boundary parameter of two processors, and the burst decrease parameter is initialized to the upper boundary parameter of six processors. By these initializations, the burst increase and decrease parameters are set at opposite boundaries of the allocation range. Later, during the operation of virtual machine 208, the burst increase and decrease parameters may grow towards and then past each other within the allocation range, as discussed below.

In an embodiment in which resource 212 instead corresponds to memory resource 114, then each of the above parameters could be expressed in terms of memory units, rather than processor units. For example, in such an embodiment, the initial allocation parameter of resource 212 could be one gigabyte of memory, instead of two processors.

Hypervisor program 106 implements an increment threshold and a decrement threshold, which specify conditions upon which resource 212 will be scaled up or down, respectively. Each threshold can be expressed as a utilization level and a length of time, and can be evaluated periodically, where the periodicity of evaluation is typically equal to or less than the length of time. However, in some embodiments the periodicity of evaluation of a threshold can be greater than the length of time expressed in the threshold. An increment threshold can be expressed as "increase the allocation of resource 212 by the increment parameter if the utilization level equals or exceeds 75 percent for at least 15 minutes," and can be evaluated every five minutes, for example. Further, a decrement threshold can be expressed as "decrease the allocation of resource 212 by the decrement parameter if the utilization level is less than 25 percent for at least 15 minutes," and can be evaluated every 10 minutes. In various embodiments, the decrement threshold includes a further restriction, such that even if the decrement threshold expressed above is satisfied, the allocation is not actually decreased if doing so would probably trigger the increment threshold. Thus, in such embodiments, the decrement threshold can be expressed, in total, as "decrease the allocation of resource 212 by the decrement parameter if the current utilization level is less than 25 percent for at least 15 minutes, and if the current utilization level multiplied by the ratio of the current allocation to the decreased allocation is less than the conditional utilization level expressed in the increment threshold." A decrement threshold including this further restriction can help prevent undesirable allocation oscillation.

The increment and decrement thresholds are expressed in terms of the increment and decrement parameter, respectively. The increment threshold can be modified to incorporate the burst increase parameter. For example, if the increment threshold is satisfied, and if increasing the allocation of resource 212 by the increment parameter will leave it lower than the historical limit of the burst increase parameter, then the allocation of resource 212 is increased all the way up to the limit of the burst increase parameter. Stated another way, if the increment threshold is satisfied, then the allocation of resource 212 is increased to the higher of the burst increase parameter, or the sum of the allocation of resource 212 and the increment threshold (subject, of course, to the upper boundary parameter). The decrement threshold can be similarly modified, both in an original form and in a form modified with a further restriction to prevent undesirable allocation oscillation, as related above.

The several thresholds and variety of parameters can be manually defined, automatically defined, or selected according to one of several policies. For example, hypervisor program 106 can implement several vertical scalability policies, each of which controls several resources and which is predefined for a particular use case. In particular, a stable application policy can be defined to control processor and memory resources, such that the upper and lower boundary parameters are both low, such that increment and decrement parameters are both low, and such that the increment and decrement thresholds are evaluated infrequently. Further, a volatile application policy can be defined to control processor and memory resources, such that the upper boundary parameter is greater than that in the stable application policy, such that increment and decrement parameters are both greater than those in the stable application policy, and such that the increment and decrement thresholds are evaluated frequently. A number of additional policies can be implemented in hypervisor program 106.

Having discussed several thresholds and a variety of parameters of hypervisor program 106, discussion now turns to the time lapse progression of the vertical scaling of resources allocated to virtual machine 208. As shown in utilization history 222, at time T1 the usage rate of resource 212 is 25 percent (prior to time T1, virtual machine 208 was defined and received a workload). As such, neither the increment threshold nor the decrement threshold is satisfied, regardless of how long prior to time T1 virtual machine 208 was defined. Therefore, hypervisor program 106 performs no scaling on virtual machine 208 at time T1, such that resource 212 continues to include two processors, as shown in progression 220. Several minutes after time T1, the utilization of resource 212 increases significantly, from 25 percent to above 75 percent. Such an increase could occur because of, for example, an increased workload applied to virtual machine 208. If virtual machine 208 is a web server, then such an increased workload could occur due to a surge of inbound web traffic. If virtual machine 208 is a scientific numerical simulator, then such an increased workload could occur when a new simulation begins execution.

In between time T1 and time T2, hypervisor program 106 evaluates the increment threshold once at each five minute mark, and evaluates the decrement threshold once at the 10 minute mark. The decrement threshold is not satisfied upon its single evaluation because the utilization is too high. The increment threshold is not satisfied upon any of its three evaluations, because upon none of them has the utilization level equaled or exceeded 75 percent for at least 15 minutes.

At time T2 the usage rate of resource 212 is above 75 percent, and has been so for over 15 minutes. As such, the increment threshold is satisfied. Therefore, hypervisor program 106 performs scaling on virtual machine 208 at time T2, according to the increment parameter, such that resource 212 is scaled up by two processors to include a total of four processors. Hypervisor program 106 also increases the burst increase parameter from two processors, its initial value, to four processors. As shown in utilization history 222, at time T2 the utilization level drops slightly, to 75 percent, as the additional processors assist with the workload. Notably, the depicted drop in the utilization level is not substantially inversely proportional to the increase in the number of processors. In other words, although the number of processors doubled, the depicted utilization level was not cut in half. It should be understood that in various embodiments, the response of the utilization level to the change in the number of processors may or may not be inversely proportional.

In between time T2 and time T3, hypervisor program 106 evaluates the increment threshold once at each five minute mark, and evaluates the decrement threshold once at the 10 minute mark. The decrement threshold is not satisfied upon its single evaluation because the utilization is too high. The increment threshold is satisfied upon its first evaluation, because although only five minutes have passed since time T2, and although the utilization level has dropped slightly, to 75 percent, the utilization has still equaled or exceeded 75 percent for at least 15 minutes. Therefore, hypervisor program 106 performs scaling on virtual machine 208 five minutes after time T2, according to the increment parameter, such that resource 212 is again scaled up by two more processors to include a total of six processors. Hypervisor program 106 also increases the burst increase parameter from four processors, its value at time T2, to six processors. At the following two five minute marks, the increment threshold is not satisfied, because upon neither of them has the utilization level equaled or exceeded 75 percent for at least 15 minutes.

At time T3 the usage rate of resource 212 is slightly below 75 percent, and has been so for about 15 minutes. As such, neither the increment threshold nor the decrement threshold is satisfied, and hypervisor program 106 performs no scaling on virtual machine 208 at time T3, such that resource 212 continues to include six processors, as shown in progression 220. As shown in utilization history 222, several minutes after time T3, the utilization of resource 212 decreases significantly, from slightly below 75 percent to below 25 percent. Such a decrease could occur due to a decline of inbound web traffic, or when a simulation concludes execution, for example.

In between time T3 and time T4, hypervisor program 106 evaluates the increment threshold once at each five minute mark, and evaluates the decrement threshold once at the 10 minute mark. The increment threshold is not satisfied upon its three evaluations because the utilization is too low. The decrement threshold is not satisfied upon its evaluation, because although the utilization level has dropped significantly, it has not been less than 25 percent for at least 15 minutes. Therefore, hypervisor program 106 performs no scaling on virtual machine 208 between time T3 and time T4.

At time T4 the usage rate of resource 212 is below 25 percent, and has been so for over 15 minutes. As such, the decrement threshold is satisfied. Therefore, hypervisor program 106 performs scaling on virtual machine 208 at time T4, according to the decrement parameter, such that resource 212 is scaled down by one processor to include a total of five processors, as shown in progression 220. Hypervisor program 106 also decreases the burst decrease parameter from six processors, its initial value, to five processors. As shown in utilization history 222, at time T4 the utilization level increases slightly, toward 25 percent, as the removed processor can no longer assist with the workload. In one embodiment the decrement threshold includes a further restriction to help prevent undesirable allocation oscillation, as discussed above. In such an embodiment, upon the satisfaction of the decrement threshold at time T4, evaluation of the further restriction shows that the current utilization level multiplied by the ratio of the current allocation to the decreased allocation is less than the conditional utilization level expressed in the increment threshold, and so scaling is performed according to the decrement parameter.

In between time T4 and time T5, hypervisor program 106 evaluates the increment threshold once at each five minute mark, and evaluates the decrement threshold once at the 10 minute mark. The increment threshold is not satisfied upon any of its three evaluations because the utilization is too low. The decrement threshold is satisfied upon its evaluation at the 10 minute mark, because the utilization has been below 25 percent for at least 15 minutes. Therefore, hypervisor program 106 performs scaling on virtual machine 208 10 minutes after time T4, according to the decrement parameter, such that resource 212 is again scaled down by one more processor to include a total of four processors. Hypervisor program 106 also decreases the burst decrease parameter from five processors, its value at time T4, to four processors. As shown in utilization history 222, the utilization level increases slightly again, to 25 percent, as the removed processor can no longer assist with the workload. In one embodiment the decrement threshold includes a further restriction to help prevent undesirable allocation oscillation, as discussed above. In such an embodiment, upon the satisfaction of the decrement threshold at the 10 minute mark after time T4, evaluation of the further restriction shows that the current utilization level multiplied by the ratio of the current allocation to the decreased allocation is less than the conditional utilization level expressed in the increment threshold, and so scaling is performed according to the decrement parameter.

At time T5 the usage rate of resource 212 is 25 percent, and has been so for about 10 minutes. As such, neither the increment threshold nor the decrement threshold is satisfied, and hypervisor program 106 performs no scaling on virtual machine 208 at time T5, such that resource 212 continues to include four processors, as shown in progression 220.

Between time T1 and time T5, virtual machine 208 has handled a utilization surge by incrementally increasing and then decreasing the allocation of resource 212. During this time, the burst increase parameter has increased from two to six processors, and the burst decrease parameter has decreased from six to four processors. With this summary, discussion now turns to FIG. 2B, which relates to events in the future of time T5.

Figure 2B:
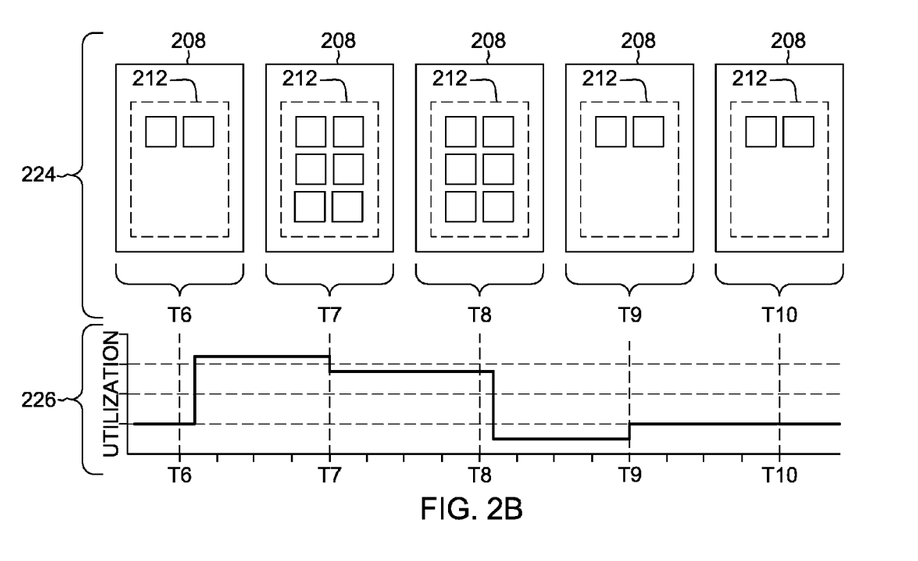

FIG. 2B illustrates a time lapse progression of the vertical scaling of resources allocated to a virtual machine, according to one embodiment of the present invention. In particular, progression 224 illustrates virtual machine 208 at five different times over the period including times T6 through T10, and utilization history 226 illustrates the usage rate of resource 212 of virtual machine 208 over substantially the same period. Time T6 is in the future of time T5, and therefore the events discussed above in relation to FIG. 2A are in the operational history of virtual machine 208 as discussed in FIG. 2B. Like utilization history 222, the horizontal axis of utilization history 226 is marked at five minute intervals, such that the amount of time between each consecutive pair of times in times T6 through T10 is 20 minutes (e.g., time T6 to time T7 is 20 minutes, time T7 to time T8 is 20 minutes, etc.), and the vertical axis of utilization history 226 is marked at 25 percent intervals.

As shown in progression 224, at time T6 resource 212 has an allocation of two processors. It should be understood that between time T5 and time T6, events have unfolded which reduced the allocation of resource 212 from four processors to two processors, and that the burst increase parameter remains at six processors while the burst decrease parameter has declined to two processors.

As shown in utilization history 226, at time T6 the usage rate of resource 212 is 25 percent. As such, neither the increment threshold nor the decrement threshold is satisfied. Therefore, hypervisor program 106 performs no scaling on virtual machine 208 at time T6, such that resource 212 continues to include two processors, as shown in progression 224. Several minutes after time T6, the utilization of resource 212 increases significantly, from 25 percent to above 75 percent. Such an increase could occur because of, for example, a second increased workload applied to virtual machine 208.

In between time T6 and time T7, hypervisor program 106 evaluates the increment threshold once at each five minute mark, and evaluates the decrement threshold once at the 10 minute mark. The decrement threshold is not satisfied upon its single evaluation because the utilization is too high. The increment threshold is not satisfied upon any of its three evaluations, because upon none of them has the utilization level equaled or exceeded 75 percent for at least 15 minutes.

At time T7 the usage rate of resource 212 is above 75 percent, and has been so for over 15 minutes. As such, the increment threshold is satisfied. Therefore, hypervisor program 106 performs scaling on virtual machine 208 at time T7, according to the burst increase parameter, such that resource 212 is scaled up to six processors. Scaling is performed according to the burst increase parameter instead of according to the increment parameter because, as stated above, if increasing the allocation of resource 212 by the increment parameter will leave it lower than the historical limit of the burst increase parameter, then the allocation of resource 212 is increased all the way up to the limit of the burst increase parameter. Notably, scaling was never performed according to the burst increase parameter between time T1 and time T5 because at the beginning of that time period, the burst increase parameter had been initialized to the lower boundary parameter. Thus, scaling is typically performed according to the burst increase parameter only after a complete surge and then ebb of workflow has occurred in the operational history of virtual machine 208. As shown in utilization history 226, at time T7 the utilization level drops to slightly below 75 percent as the additional processors assist with the workload. Notably, the depicted drop in the utilization level is not substantially inversely proportional to the increase in the number of processors. In other words, although the number of processors tripled, the depicted utilization level was not cut by two thirds. It should be understood that in various embodiments, the response of the utilization level to the change in the number of processors may or may not be inversely proportional.

In between time T7 and time T8, hypervisor program 106 evaluates the increment threshold once at each five minute mark, and evaluates the decrement threshold once at the 10 minute mark. The decrement threshold is not satisfied upon its single evaluation because the utilization is too high. The increment threshold is not satisfied upon its three evaluations, because the utilization has not equaled or exceeded 75 percent for at least 15 minutes. Therefore, hypervisor program 106 performs no scaling on virtual machine 208 between time T7 and time T8.

At time T8 the usage rate of resource 212 is slightly below 75 percent, and has been so since time T7. Neither the increment threshold nor the decrement threshold is satisfied, and hypervisor program 106 performs no scaling on virtual machine 208 at time T8, such that resource 212 continues to include six processors. As shown in utilization history 226, several minutes after time T8, the utilization of resource 212 decreases significantly, from slightly below 75 percent to below 25 percent.

In between time T8 and time T9, hypervisor program 106 evaluates the increment threshold once at each five minute mark, and evaluates the decrement threshold once at the 10 minute mark. The increment threshold is not satisfied upon its three evaluations because the utilization is too low. The decrement threshold is not satisfied upon its evaluation, because although the utilization level has dropped significantly, it has not been less than 25 percent for at least 15 minutes. Therefore, hypervisor program 106 performs no scaling on virtual machine 208 between time T8 and time T9.

At time T9 the usage rate of resource 212 is below 25 percent, and has been so for over 15 minutes. As such, the decrement threshold is satisfied. Therefore, hypervisor program 106 performs scaling on virtual machine 208 at time T9, according to the burst decrease parameter, such that resource 212 is scaled down to two processors, as shown in progression 224. Scaling is performed according to the burst decrease parameter instead of according to the decrement parameter because, if decreasing the allocation of resource 212 by the decrement parameter will leave it higher than the historical limit of the burst decrease parameter, then the allocation of resource 212 is decreased all the way down to the limit of the burst decrease parameter. Notably, scaling was never performed according to the burst decrease parameter between time T1 and time T5 because at the beginning of that time period, the burst decrease parameter had been initialized to the upper boundary parameter. Thus, scaling is typically performed according to the burst decrease parameter only after a complete ebb and then surge of workflow has occurred in the operational history of virtual machine 208. As shown in utilization history 226, at time T9 the utilization level increases to 25 percent, as the removed processors can no longer assist with the workload. In one embodiment the decrement threshold includes a further restriction to help prevent undesirable allocation oscillation, as discussed above. In such an embodiment, upon the satisfaction of the decrement threshold at time T9, evaluation of the further restriction shows that the current utilization level multiplied by the ratio of the current allocation to the decreased allocation is less than the conditional utilization level expressed in the increment threshold, and so scaling is performed according to the burst decrease parameter.

In between time T9 and time T10, hypervisor program 106 evaluates the increment threshold once at each five minute mark, and evaluates the decrement threshold once at the 10 minute mark. The increment threshold is not satisfied upon any of its three evaluations because the utilization is too low. The decrement threshold is not satisfied upon its evaluation because the utilization has not been below 25 percent for at least 15 minutes. Therefore, hypervisor program 106 performs no scaling on virtual machine 208 between time T9 and time T10.

At time T10 the usage rate of resource 212 is 25 percent, and has been so for about 20 minutes. As such, neither the increment threshold nor the decrement threshold is satisfied, and hypervisor program 106 performs no scaling on virtual machine 208 at time T10, such that resource 212 continues to include two processors, as shown in progression 224.

Between time T6 and time T10, virtual machine 208 has handled a second utilization surge by burst increasing and then burst decreasing the allocation of resource 212. During this time, the burst increase and burst decrease parameters have remained unchanged.

Figure 3:
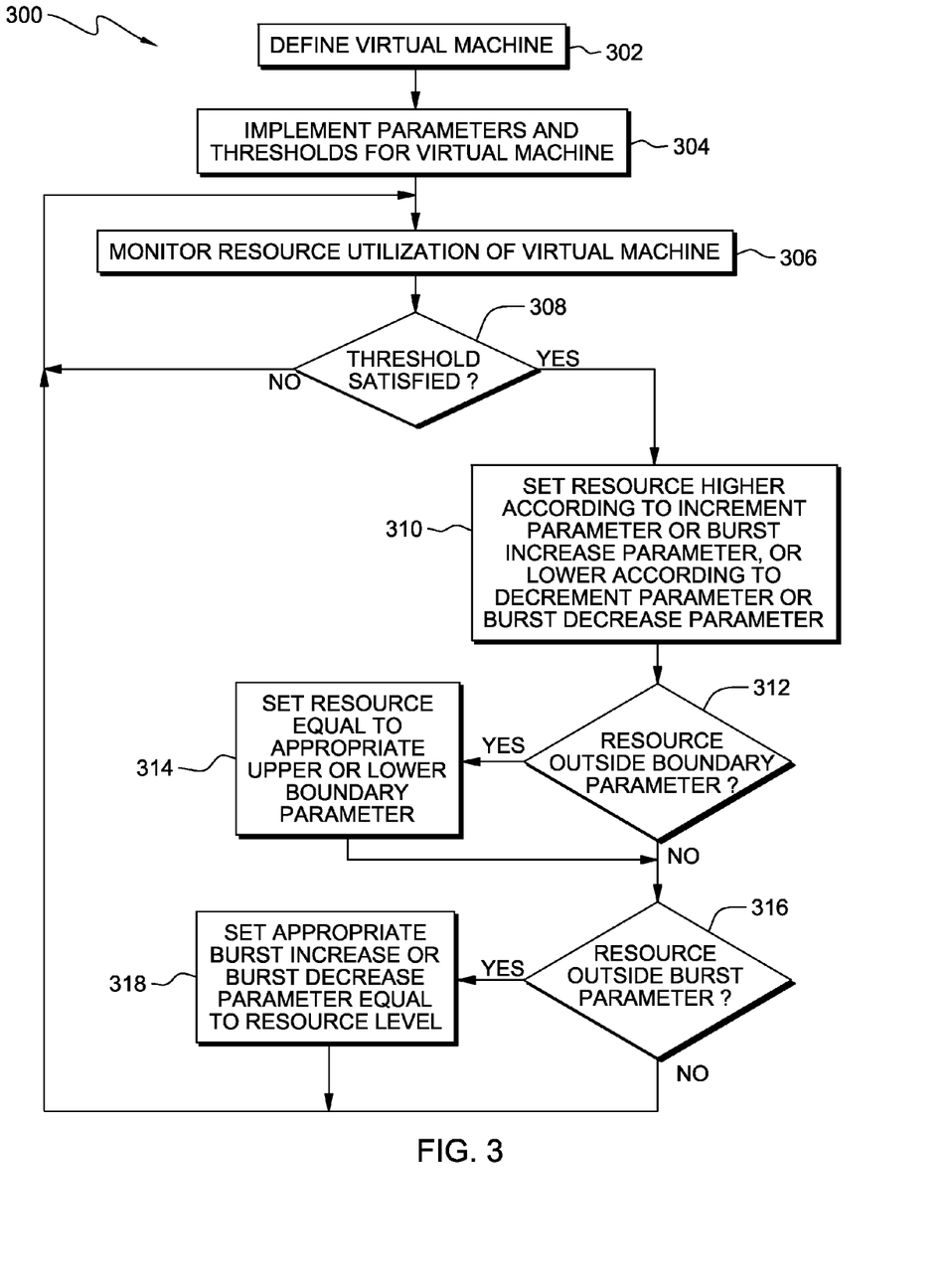
FIG. 3 illustrates a flowchart depicting the steps performed in the virtualized computer environment of FIG. 1 to vertically scale resources allocated to a virtual machine, according to one embodiment of the present invention.

FIG. 3 illustrates flowchart 300 depicting the steps performed in virtualized computer environment 100 to vertically scale resources allocated to a virtual machine, according to one embodiment of the present invention. In step 302, hypervisor program 106 defines a virtual machine, such as virtual machine 208, from the resources of computer 104 through logical sharing of processors, storage disks, network cards, memory, and other resources. During definition virtual machine 208 can also receive a workload. In step 304, hypervisor program 106 implements parameters and thresholds for virtual machine 208. For example, hypervisor program 106 can implement an initial allocation parameter, upper and lower boundary parameters, increment and decrement parameters, and burst increase and burst decrease parameters. Further, hypervisor program 106 can implement increment and decrement thresholds, which are expressed in terms of the increment and decrement parameters, respectively, as well as the burst increase and burst decrease parameters, respectively.

In step 306, after virtual machine 208 has been defined and has received a workload, hypervisor program 106 monitors resource utilization of virtual machine 208. For example, hypervisor program 106 can monitor the utilization history of resource 212, which in various embodiments can be a processor resource, a memory resource, or another kind of resource. In step 308, hypervisor program 106 determines whether or not a threshold has been satisfied. For example, hypervisor program 106 can periodically determine whether the increment threshold has been satisfied, and can also periodically determine whether the decrement threshold has been satisfied. Various thresholds may have similar or different periodicities. In particular, as discussed above, the increment threshold can be evaluated every five minutes, and the decrement threshold can be evaluated every ten minutes. If no threshold has been satisfied, then hypervisor program 106 resumes monitoring in step 306. However, if a threshold has been satisfied, then hypervisor program 106 proceeds to step 310.

In step 310, hypervisor program 106 scales up or scales down the monitored resource depending on the threshold that has been satisfied. For example, if the increment threshold is satisfied, and if increasing the allocation of resource 212 by the increment parameter will leave it lower than the historical limit of the burst increase parameter, then the allocation of resource 212 is increased all the way up to the limit of the burst increase parameter. Stated another way, if the increment threshold is satisfied, then the allocation of resource 212 is increased to the higher of the burst increase parameter, or the sum of the allocation of resource 212 and the increment threshold. In contrast, if the decrement threshold is satisfied, the allocation of resource 212 can be similarly reduced. In one embodiment the decrement threshold includes a further restriction to help prevent undesirable allocation oscillation, as discussed above.

In step 312, hypervisor program 106 determines whether the scaled up or scaled down resource is outside the upper boundary parameter or the lower boundary parameter, respectively. For example, if resource 212 has been scaled up from five processors to seven processors by adding the increment parameter of two processors, but the upper boundary parameter is six processors, then resource 212 is outside the upper boundary parameter. In this circumstance, in step 314 hypervisor program 106 reduces resource 212 to equal the upper boundary parameter of six processors. If resource 212 had been outside the lower boundary parameter, then in step 314 hypervisor program 106 would have increased resource 212 to equal the lower boundary parameter of two processors. After step 314, hypervisor program 106 proceeds to step 316. If resource 212 is not outside the upper or lower boundary parameter, then hypervisor program 106 skips step 314 and proceeds directly to step 316.

In step 316, hypervisor program 106 determines whether the scaled up or scaled down resource is outside the burst increase or burst decrease parameter, respectively. For example, if resource 212 has been scaled up from two processors to four processors by adding the increment parameter of two processors, but the burst increase parameter is two processors, then resource 212 is outside the burst increase parameter. In this circumstance, in step 318 hypervisor program 106 sets the burst increase parameter to equal resource 212. If resource 212 had been outside the burst decrease parameter, then in step 318 hypervisor program 106 would have set the burst decrease parameter to equal resource 212. After step 318, hypervisor program 106 proceeds to step 306. If resource 212 is not outside the burst increase or burst decrease parameter, then hypervisor program 106 skips step 318 and proceeds directly to step 306. Having returned to step 306 after step 316 or step 318, hypervisor program 106 continues monitoring resource utilization.

Figure 4:
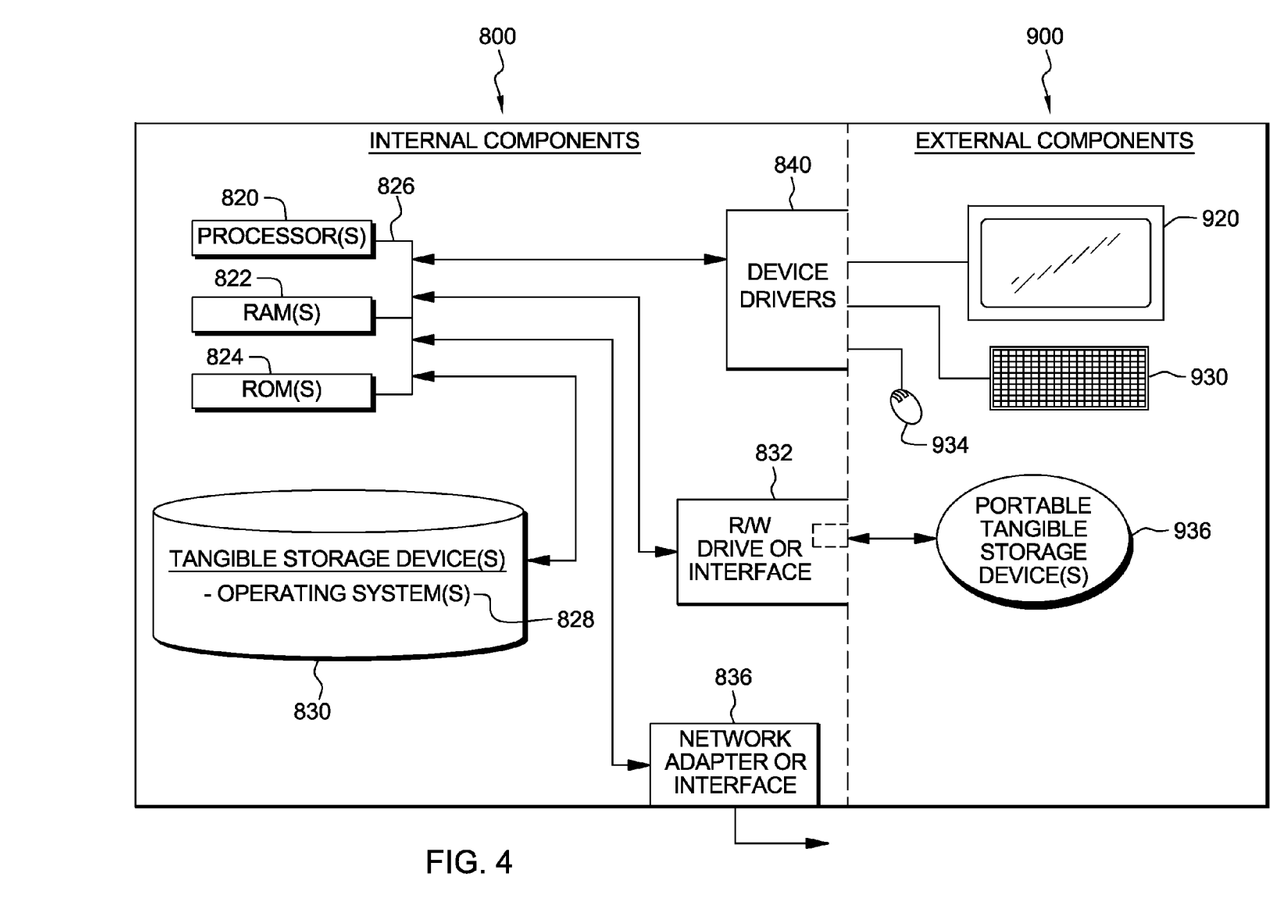
FIG. 4 depicts a block diagram of components of the computer of FIG. 1 in accordance with an illustrative embodiment of the present invention.

Turning now to FIG. 4, computer 104 includes respective sets of internal components 800 and external components 900 as illustrated. Each of the sets of internal components 800 includes one or more processors 820, one or more computer-readable RAMs 822 and one or more computer-readable ROMs 824 on one or more buses 826, one or more operating systems 828 and one or more computer-readable tangible storage devices 830. The one or more operating systems 828, including operating systems of virtual machine 108 and 110, and hypervisor program 106 are stored on one or more of the respective computer-readable tangible storage devices 830 for execution by one or more of the respective processors 820 via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store but does not transmit a computer program and digital information.

Each set of internal components 800 also includes a R/W drive or interface 832 to read from and write to one or more portable computer-readable tangible storage devices 936 that can store but do not transmit a computer program, such as a CD-ROM, DVD, memory stick, magnetic tape, magnetic disk, optical disk or semiconductor storage device. The hypervisor program 106 can be stored on one or more of the respective portable computer-readable tangible storage devices 936, read via the respective R/W drive or interface 832 and loaded into the respective hard drive or semiconductor storage device 830.

Each set of internal components 800 also includes a network adapter or interface 836 such as a TCP/IP adapter card or wireless communication adapter (such as a 4G wireless communication adapter using OFDMA technology). The hypervisor program 106 can be downloaded to the respective computing/processing devices from an external computer or external storage device via a network (for example, the Internet, a local area network or other, wide area network or wireless network) and network adapter or interface 836. From the network adapter or interface 836, hypervisor program 106 is loaded into the respective hard drive or semiconductor storage device 830. The network may comprise copper wires, optical fibers, wireless transmission, routers, firewalls, switches, gateway computers and/or edge servers.

Each of the sets of external components 900 includes a display screen 920, a keyboard or keypad 930, and a computer mouse or touchpad 940. Each of the sets of internal components 800 also includes device drivers 840 to interface to display screen 920 for imaging, to keyboard or keypad 930, to computer mouse or touchpad 940, and/or to display screen for pressure sensing of alphanumeric character entry and user selections. The device drivers 840, R/W drive or interface 832 and network adapter or interface 836 comprise hardware and software (stored in storage device 830 and/or ROM 824).

Hypervisor program 106 and the operating systems of the virtual machines can be written in various programming languages (such as Java, C++) including low-level, high-level, object-oriented or non object-oriented languages. Alternatively, the functions of the programs can be implemented in whole or in part by computer circuits and other hardware (not shown).

Based on the foregoing, a computer system, method, and program product have been disclosed for scaling resources in a virtualized computing environment. However, numerous modifications and substitutions can be made without deviating from the scope of the present invention. Therefore, the present invention has been disclosed by way of example and not limitation.

What is claimed is:

1. A method for allocating a resource to a virtual machine or logical partition (LPAR), the method comprising the steps of:
   a computer determining that a utilization level of a resource has satisfied a threshold;
   the computer scaling the allocation of the resource to the mathematically greater of (i) the current allocation of the resource plus a parameter and (ii) a historical limit, wherein the historical limit is a maximum value over a historical period; and
   the computer determining if the scaled allocation of the resource is outside the historical limit and if so, setting the historical limit equal to the scaled allocation of the resource.

2. The method of claim 1, wherein the computer includes a hypervisor.

3. The method of claim 1, wherein the resource includes a processor resource or a memory resource.

4. The method of claim 1, wherein the resource includes a resource of a virtual machine.

5. The method of claim 1, wherein the threshold is one of an increment threshold and a decrement threshold.

6. The method of claim 1, further comprising the step of:
the computer determining whether the scaling of the allocation of the resource will result in an allocation oscillation.

7. The method of claim 1, further comprising the step of:
the computer determining if the scaled allocation of the resource is outside a boundary parameter and if so, setting the allocation of the resource equal to the boundary parameter.

8. A computer program product for allocating a resource to a virtual machine or logical partition (LPAR), the computer program product comprising:
one or more computer-readable tangible storage devices and program instructions stored on at least one of the one or more storage devices, the program instructions comprising:
program instructions to determine that a utilization level of a resource has satisfied a threshold;
program instructions to scale the allocation of the resource to the mathematically greater of the current allocation of the resource plus a parameter and of a historical limit, wherein the historical limit is a maximum value over a historical period; and
program instructions to determine if the scaled allocation of the resource is outside the historical limit and if so, setting the historical limit equal to the scaled allocation of the resource.

9. The computer program product of claim 8, wherein the computer program product includes at least a portion of a hypervisor.

10. The computer program product of claim 8, wherein the resource includes a processor resource or a memory resource.

11. The computer program product of claim 8, wherein the resource includes a resource of a virtual machine.

12. The computer program product of claim 8, wherein the threshold is one of an increment threshold and a decrement threshold.

13. The computer program product of claim 8, further comprising:
program instructions to determine whether the scaling of the allocation of the resource will result in an allocation oscillation.

14. The computer program product of claim 8, further comprising:
program instructions to determine if the scaled allocation of the resource is outside a boundary parameter and if so, to set the allocation of the resource equal to the boundary parameter.

15. A system for allocating a resource to a virtual machine or logical partition (LPAR), the system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to determine that a utilization level of a resource has satisfied a threshold;
program instructions to scale the allocation of the resource to the mathematically greater of the current allocation of the resource plus a parameter and of a historical limit, wherein the historical limit is a maximum value over a historical period; and
program instructions to determine if the scaled allocation of the resource is outside the historical limit and if so, setting the historical limit equal to the scaled allocation of the resource.

16. The system of claim 15, wherein the resource includes a processor resource or a memory resource.

17. The system of claim 15, wherein the resource includes a resource of a virtual machine.

18. The system of claim 15, wherein the threshold is one of an increment threshold and a decrement threshold.

19. The system of claim 15, further comprising:
program instructions to determine whether the scaling of the allocation of the resource will result in an allocation oscillation.

20. The system of claim 15, further comprising:
program instructions to determine if the scaled allocation of the resource is outside a boundary parameter and if so, to set the allocation of the resource equal to the boundary parameter.

* * * * *